UNITED STATES PATENT OFFICE.

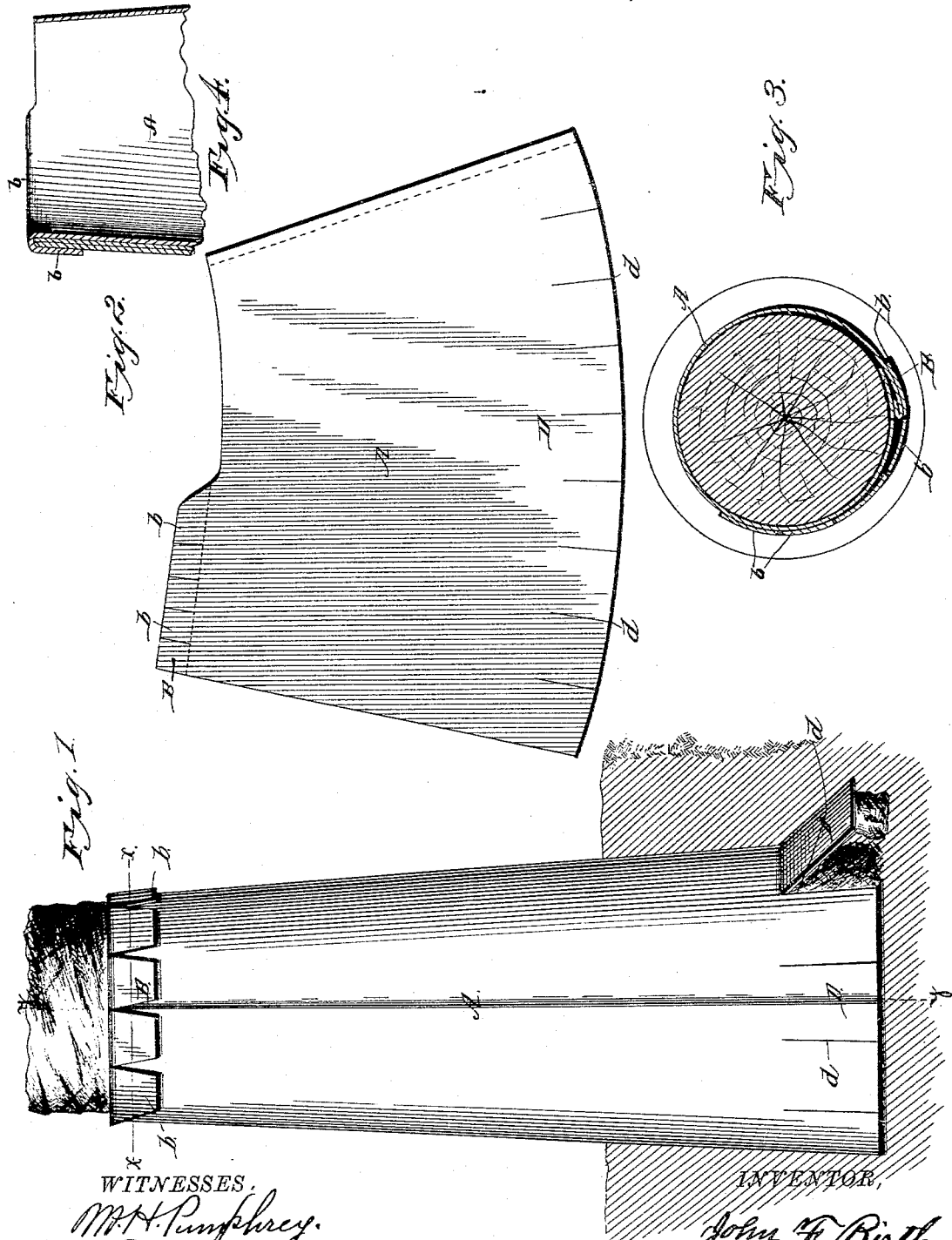

JOHN F. BIRTH, OF NESCOPECK, ASSIGNOR OF ONE-HALF TO ROBERT BIRTH, OF ROSS, LUZERNE COUNTY, PENNSYLVANIA.

TREE-PROTECTOR.

SPECIFICATION forming part of Letters Patent No. 389,047, dated September 4, 1888.

Application filed May 19, 1888. Serial No. 274,368. (No model.)

*To all whom it may concern:*

Be it known that I, JOHN F. BIRTH, a citizen of the United States, residing at Nescopeck, in the county of Luzerne and State of Pennsylvania, have invented certain new and useful Improvements in Tree-Protectors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to plant and tree protectors.

The invention has for its object to provide a devise for protecting trees and plants from borers or grub-worms that bore into the trunk of the tree within a few inches below the surface of the ground, and which will be simple, cheap, self-adjusting to accommodate itself to the growth of the tree, and which will be capable of being readily applied.

The improvement consists of the details of construction which hereinafter will be more fully described and claimed, and shown in the drawings, in which—

Figure 1 is a side view showing the application of the protector; Fig. 2, a plan view of the protector, on a small scale, showing the shape of the same before being applied; Fig. 3, a cross-section on the line X X of Fig. 1, and Fig. 4 a vertical section of the upper part of the protector on the line Y Y of Fig. 1.

The protector A, made of sheet material, has its edges overlapped some considerable distance and is flaring, having the appearance of a truncated cone. The upper end of the protector is provided with the overhanging portion B, which embraces the ends of the overlapping edges and holds them together. This overhanging portion B is an extension of one of the overlapping edges and is notched or cut to form a series of flaps, *b*, which are bent down over the other overlapping edge. The lower end or base of the protector is provided with a series of cuts or slits, *d*, which form the wings D, which yield and accommodate themselves to the roots of the tree. The edges of the protector are folded to strengthen them.

In practice the protectors are formed in blank, as shown in Fig. 2, and kept in stock or shipped in piles. The blank is placed about the tree, the edges being overlapped sufficiently to have the upper end fit close about the trunk of the tree, and the flaps *b* of one edge are bent down over the end of the other edge. The earth is loosened about the tree to permit the lower end of the protector to enter some distance below the surface of the ground. As the tree develops, the edges of the protector slide past one another and accommodate the protector to the growth of the tree.

Having thus described my invention, what I claim, and desire to secure by Letters Patent, is—

1. The herein-described protector having its edges overlapped and having the upper end of one of the overlapping edges extended and adapted to be bent down over the upper end of the other overlapping edge, substantially as and for the purpose described.

2. The herein-described protector having its edges overlapped and having its base or lower end provided with a series of slits, and having the end of one of the overlapping edges extended and cut to form a series of flaps, which flaps are bent down over the other overlapping edge, substantially as and for the purpose described.

In testimony whereof I affix my signature in presence of two witnesses.

JOHN F. BIRTH.

Witnesses:
A. B. RITTENHOUSE,
W. E. SMITH.